United States Patent
Ulrich et al.

(10) Patent No.: US 9,381,934 B2
(45) Date of Patent: Jul. 5, 2016

(54) STEERING SYSTEM

(71) Applicant: AUDI AG, Ingolstadt (DE)

(72) Inventors: Pfeiffer Ulrich, Karlskron (DE); Koch Tilo, Ingolstadt (DE); Wilding Werner, Walting (DE); Tuschkan Alwin, Ingolstadt (DE); Schulz Benjamin, Buxheim (DE); Lorenz Stephan, München (DE); Klinger Thomas, Ingolstadt (DE); Nagl Martin, Rennertshofen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/748,472

(22) Filed: Jun. 24, 2015

(65) Prior Publication Data

US 2015/0375772 A1    Dec. 31, 2015

(30) Foreign Application Priority Data

Jun. 25, 2014    (DE) .......................... 10 2014 009 517

(51) Int. Cl.
*B62D 1/19* (2006.01)
*B62D 5/00* (2006.01)

(52) U.S. Cl.
CPC ................ *B62D 1/192* (2013.01); *B62D 1/195* (2013.01); *B62D 5/001* (2013.01); *B62D 5/006* (2013.01)

(58) Field of Classification Search
CPC ........ B62D 1/192; B62D 1/195; B62D 5/001; B62D 5/006
See application file for complete search history.

(56) References Cited

U.S. PATENT DOCUMENTS

| | | | | |
|---|---|---|---|---|
| 3,662,610 A * | 5/1972 | Thoen | ...................... | G05G 5/04 74/10.2 |
| 5,662,003 A * | 9/1997 | Ohara | ...................... | G05G 1/08 74/498 |
| 6,492,807 B2 * | 12/2002 | Spellman | .................. | G01D 5/04 180/400 |
| 6,688,645 B2 * | 2/2004 | Andonian | ................ | B62D 1/16 180/6.26 |
| 2003/0141136 A1 | 7/2003 | Menjak et al. | | |
| 2003/0184072 A1 * | 10/2003 | Andonian | ................ | B62D 1/16 280/779 |
| 2015/0239490 A1 * | 8/2015 | Sakata | ................... | B62D 1/195 74/493 |

FOREIGN PATENT DOCUMENTS

| | | |
|---|---|---|
| DE | 103 12 516 | 10/2003 |
| JP | 2009-280044 | 12/2009 |

OTHER PUBLICATIONS

European Search Report with respect to counterpart European patent application EP 15 00 1679.
Translation of European Search Report with respect to counterpart European patent application EP 15 00 1679.

* cited by examiner

*Primary Examiner* — Drew Brown
(74) *Attorney, Agent, or Firm* — Henry M. Feiereisen LLC.

(57) ABSTRACT

An electric steering system includes a steering wheel and a first housing in which a steering shaft is arranged and rotatably mounted to a motor vehicle. A locking device is provided to lock the steering shaft at conclusion of a rotation as limitation of a steering angle input. The locking device includes a second housing which is connected in fixed rotative engagement with the first housing, and a locking bar configured for engagement in the steering shaft and arranged in the second housing such as to impact the steering shaft, when the steering shaft moves in relation to the second housing in the event of a crash, and to deform the first housing.

20 Claims, 3 Drawing Sheets

STEERING SYSTEM

CROSS-REFERENCES TO RELATED APPLICATIONS

This application claims the priority of German Patent Application, Serial No. 10 2014 009 517.7, filed Jun. 25, 2014, pursuant to 35 U.S.C. 119(a)-(d), the disclosure of which is incorporated herein by reference in its entirety as if fully set forth herein.

BACKGROUND OF THE INVENTION

The present invention relates to an electric steering system.

The following discussion of related art is provided to assist the reader in understanding the advantages of the invention, and is not to be construed as an admission that this related art is prior art to this invention.

Steering columns are designed to accommodate a steering shaft. In the event of a crash, the steering column shifts toward the dashboard, and this shift is triggered passively, when a certain force level is exceeded, for example, when a driver impacts the airbag/steering wheel. Energy is hereby absorbed in current vehicles via a defined plastic deformation of components particularly assigned for that purpose.

A drawback common to all conventional approaches is the need for particular and separate components to absorb energy during a displacement of the steering shaft. In addition, the trigger force has to be implemented mechanically. This has proven difficult. Also the trigger level is always the same, regardless of weight and seating position of the driver.

It would therefore be desirable and advantageous to provide an improved steering system to obviate prior art shortcomings and to allow absorption of energy in a simple manner in the event of a crash and resultant impact of a driver upon a steering wheel, in the absence of any mechanical connection to a steering gearbox.

SUMMARY OF THE INVENTION

According to one aspect of the present invention, an electric steering system includes a steering wheel, a first housing, a steering shaft arranged in the first housing and rotatably mounted to a motor vehicle, and a first locking device configured to lock the steering shaft at conclusion of a rotation as limitation of a steering angle input, the first locking device including a second housing connected in fixed rotative engagement with the first housing, and a locking bar configured for engagement in the steering shaft and arranged in the second housing such as to impact the first housing, when the second housing moves in relation to the first housing in the event of a crash, and to deform the first housing.

The present invention resolves prior art problems by utilizing the variable locking device required for steer-by-wire in order to absorb energy encountered during displacement of the steering column in the event of a crash.

According to another advantageous feature of the present invention, the locking bar can be arranged such that part of the first housing, when crumpling or collapsing as a result of the crash, is slashed by the locking bar in a defined manner. As a result, energy is absorbed by the plastic deformation of the (first) housing for the steering shaft.

According to another advantageous feature of the present invention, the housing for the steering shaft can have perforations along a movement path of the locking bar. The amount of energy to be absorbed in the event of a crash can be varied in dependence on the size of the perforations and material thickness in the area of the perforations.

According to another advantageous feature of the present invention, rolling-contact bearings can be provided to support the steering shaft on the first housing, with the steering shaft having a collar disposed on a steering-wheel proximate side of one of the rolling-contact bearings, and the first housing having a stop collar disposed on a steering-wheel distal side of the one of the rolling-contact bearings. As a result, the housing for the steering shaft is moved together with the steering shaft, when the steering column is displaced, whereas the (second) housing for the locking bar is hindered to move with the first housing because the housing for the locking bar is installed in a region of the steering shaft to components that are fixed to the vehicle body. As a result, the first housing deforms and is slashed.

According to another aspect of the present invention, an electric steering system includes a steering wheel, a first housing, a steering shaft arranged in the first housing and rotatably mounted to a motor vehicle, and a first locking device configured to lock the steering shaft at conclusion of a rotation as limitation of a steering angle input, the first locking device including a second housing connected in fixed rotative engagement with the first housing, and a locking bar configured for engagement in the steering shaft and arranged in the second housing such that the locking bar impacts the steering shaft, when the steering shaft moves in relation to the second housing in the event of a crash, and thereby undergoes a deformation. The thus required locking device for the steer-by-wire is again utilized in this type of steering system to absorb energy during displacement of the steering column in the event of a collision.

According to another advantageous feature of the present invention, the steering shaft can have a stop for interaction with the locking bar such that the stop deforms the locking bar, as the steering shaft collapses in the event of a crash. As the stop on the steering shaft directly acts upon the locking bar, the latter is directly deformed, thereby realizing an advantageous absorption of energy during a crash.

According to another advantageous feature of the present invention, the locking device can have a guide bore which extends perpendicular to the steering shaft, with the locking bar being arranged in the guide bore for movement in an axial direction. The arrangement of the locking bar in the second housing in this way provides a maximum lever arm for transferring forces from the locking bar onto the (first) housing for the steering shaft.

According to another advantageous feature of the present invention, the first locking device can be configured to lock the steering shaft at the conclusion of a rotation in a first rotation direction of the steering wheel, and a second locking device can be provided to lock the steering shaft at the conclusion of a rotation in a second opposite rotation direction of the steering wheel, with the first and second locking devices being selectively actuatable. As a result, two different force levels can be realized, depending on whether only one locking bar or the locking bars of both locking devices is/are moved in. Thus, the force level can be suited to the weight and seating position of the driver so that stress on the driver can be reduced in some cases.

According to another advantageous feature of the present invention, actuation of the first and second locking devices can be made dependent on an occurrence of a crash situation. Actuation of the locking devices and thus absorption of energy are hence independent on any direct mechanical impact on the system but may be ascertained and triggered by independent sensors.

According to another advantageous feature of the present invention, actuation of the first and second locking devices can be made dependent on a deployment of an airbag. Since nowadays the installation of airbags in motor vehicles is routine, their presence can be used to enable the locking devices to absorb energy during a crash.

According to another advantageous feature of the present invention, a solenoid can be provided to actuate the locking bars. This ensures a reliable and sufficiently rapid actuation of the locking bars into engagement and out of engagement of a pertaining gear wheel.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
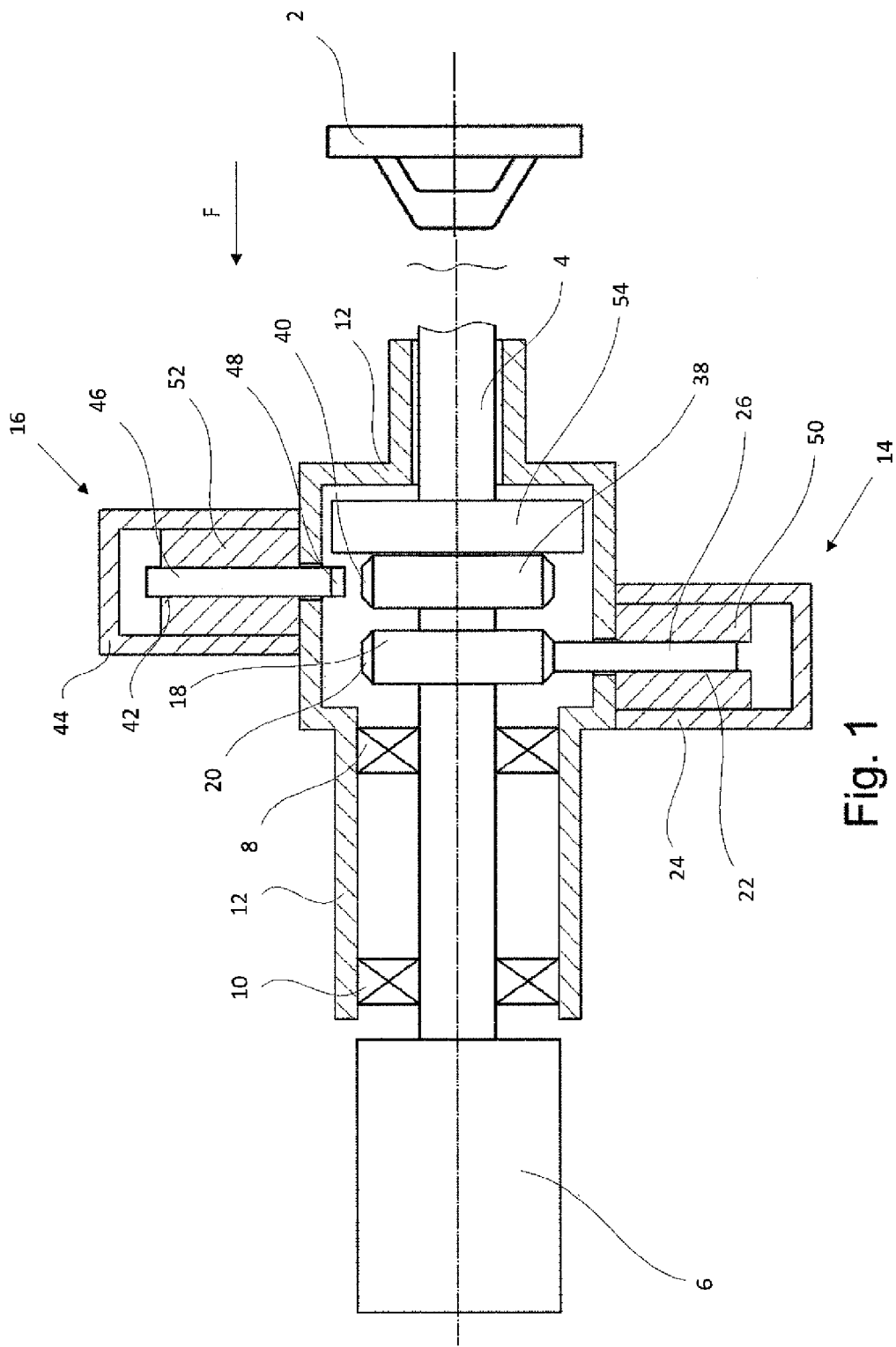
FIG. 1 is a schematic sectional view of one embodiment of a steering system according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic sectional view of one embodiment of a steering-wheel-proximal portion of an electric steering system according to the present invention. The steering system includes a steering wheel 2 which is connected via a steering shaft 4 with a feedback device 6 which is intended to provide a steering feel to the operator. The steering shaft 4, arranged in a steering column (not shown), is supported via bearings 8, 10, e.g. rolling-contact bearings, by a housing 12 for the steering shaft 4. The steering system further includes first and second locking devices 14, 16, with the first locking device 14 being provided to lock the steering shaft 4 at the conclusion of a rotation in a first rotation direction of the steering wheel 2, and with the second locking device 16 being provided to lock the steering shaft 4 at the conclusion of a rotation in an opposite second rotation direction of the steering wheel 2. In this way the steering angle in either direction can be limited. For convenience and sake of simplicity, much of the following description is made only in relation to the first locking device 14. As the locking devices 14, 16 are substantially identical in construction, it will be understood by persons skilled in the art that a description of the locking device 14 is equally applicable to the other locking device 16.

Figure 2:
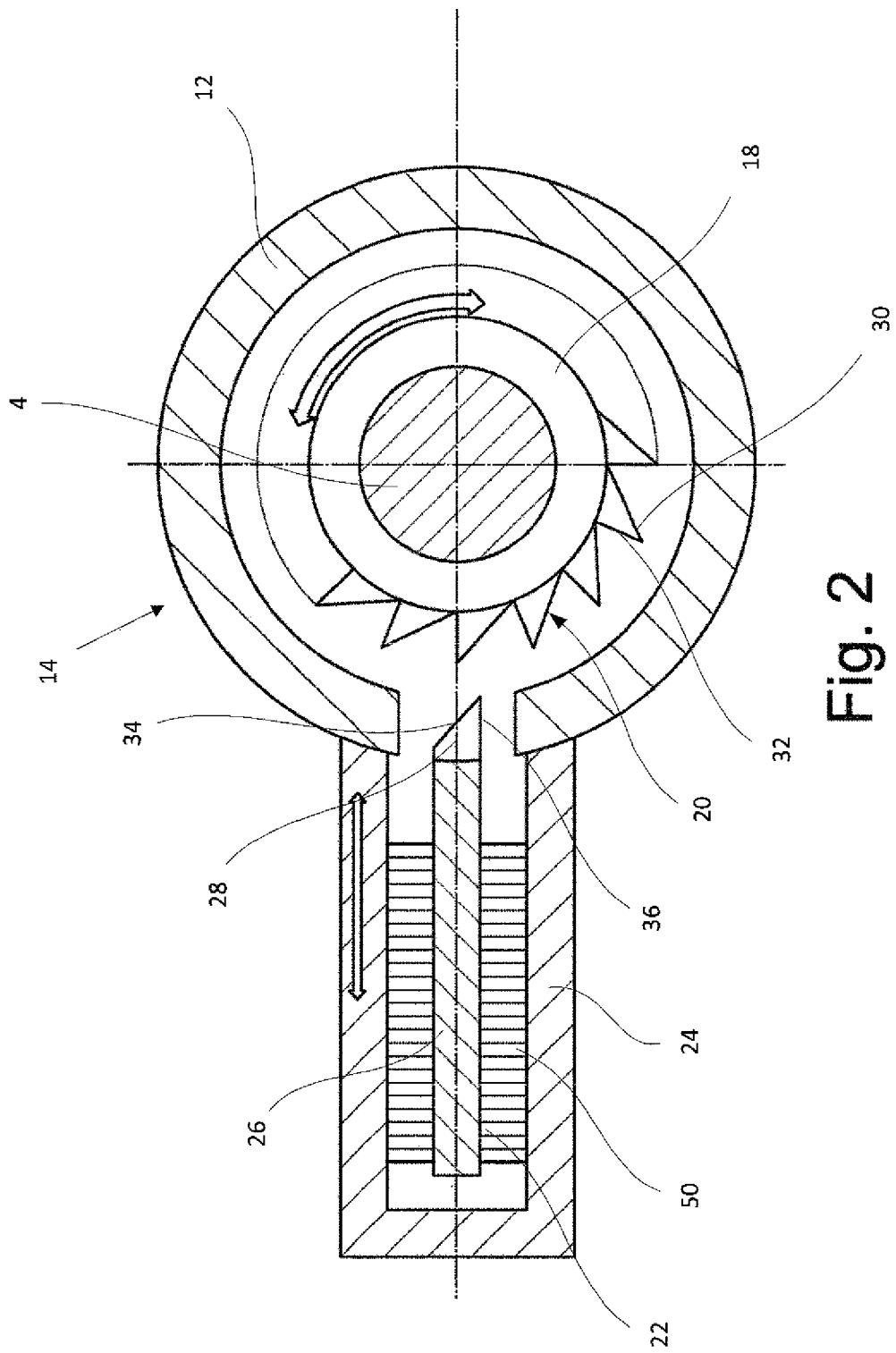
FIG. 2 is a schematic sectional view of a detail of a locking device of the steering system of FIG. 1.

The locking device 14 includes a gear wheel 18, which, as is readily apparent from FIG. 2, is provided with asymmetric teeth 20 and is mounted to the steering shaft 4. Extending in a housing 24 of the locking device 14 in perpendicular relation to the steering shaft 4 is a guide bore 22 for receiving a locking bar 26 which has an asymmetric arrangement of a mating tooth 28. Thus, the locking bar 26 can be moved in axial direction of the guide bore 22. For locking purposes, the locking bar 26 with its tooth 28 is shifted towards the gear wheel 18 to engage in an end position a space between two neighboring teeth 20 to thereby halt in a formfitting manner the rotation in the desired direction. The locking bar 26 is hereby supported by the housing 24 via the guide bore 22.

As is readily apparent from FIG. 2, the asymmetric teeth 20 on the gear wheel 18 have each a flat tooth flank 30 and a steep tooth flank 32. Likewise the mating asymmetric tooth 28 of the locking bar 26 has also a flat tooth flank 34 and a steep tooth flank 36. The tooth flanks are oriented such that a flat tooth flank 30 on the gear wheel 18 opposes the flat tooth flank 34 of the locking bar 26, and a steep tooth flank 32 on the gear wheel 18 opposes the steep tooth flank 36 of the locking bar 26. When the steering shaft 4 rotates in a direction which should not be locked by the locking device 14, the locking bar 26 is pushed back in the guide bore 14 to a disengaged or retracted end position.

The locking device 16 also includes a gear wheel 38 having asymmetric teeth 40 and secured to the steering shaft 4. A locking bar 46 of the locking device 16 is received in a guide bore 42 which extends perpendicular to the steering shaft 4 and is formed in a housing 44. The locking bar 46 is movable in axial direction in the guide bore 42 and has a mating asymmetric tooth 48. The locking device 16 differs from the locking device 14 in that the flat tooth flanks and the steep tooth flanks of the asymmetric teeth 40 on the gear wheel 38 and of the mating tooth 48 of the locking bar 46 are oriented in opposition to the flat tooth flanks and steep tooth flanks of the asymmetric teeth in the locking device 14.

The locking bars 26, 46 of both locking devices 14, 16 are actuated in locking position and in release position electromechanically by solenoids 50 and 52, respectively, which are respectively arranged in the guide bores 22 and 42 of the locking devices 14, 16. Thus, actuation of the locking bars 26, 46 can be realized at any location of the circumference of the gear wheels 18, 38.

As can be seen in FIG. 1, a stop 54 is provided on the steering shaft 4. The stop 54 moves to the left in FIG. 1 in the direction of arrow F, when subjected to a force impact and the steering shaft 4 is displaced. As a result, the stop 54 impacts the locking bar 46 and subsequently the locking bar 26 so as to thereby deform one or both locking bars 26, 46. The locking bar 46 is hereby positioned such that even when assuming the retracted position, as shown in FIG. 1, it is sized sufficient to project into a movement path of the stop 54. The locking bar 26, shown in FIG. 1 in a position in which it has moved out, i.e. assumes the engaged position, projects even further into the movement path of the stop 54 so that in the event of a crash, at least the locking bar 46 becomes deformed, or in addition the locking bar 26 becomes deformed, or even the housing 12 for the steering shaft 4 becomes deformed.

Figure 3:
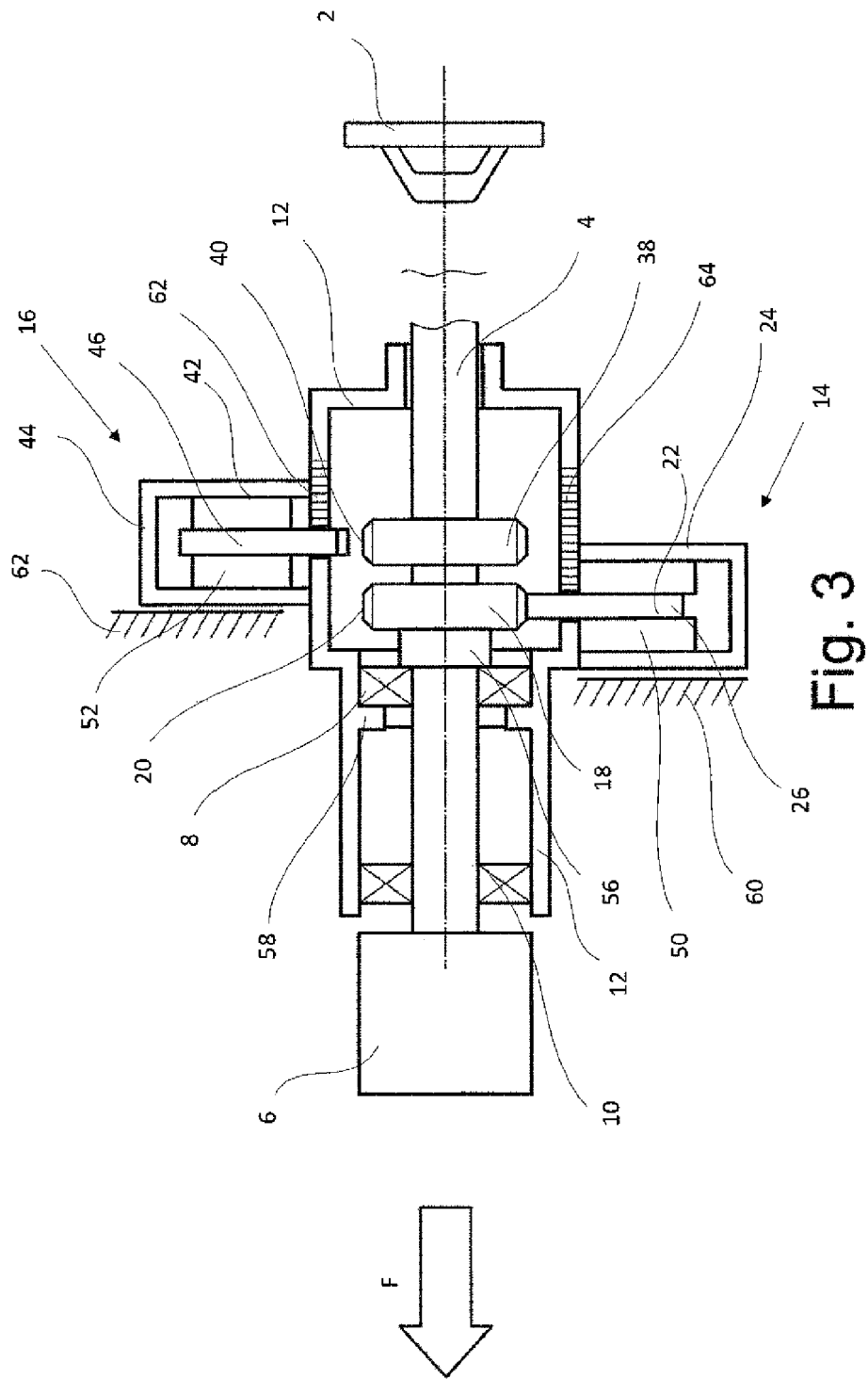
FIG. 3 is a schematic sectional view of another embodiment of a steering system according to the present invention.

Referring now to FIG. 3, there is shown a schematic sectional view of another embodiment of a steering system according to the present invention. Parts corresponding with those in FIG. 1 are denoted by identical reference numerals and not explained again. The description below will center on the differences between the embodiments. In this embodiment, provision is made for a locking bar 46 which is arranged and positioned such as to impact the housing 12 for the steering shaft 4, when the housing 12 is shifted in relation to the housing 24, 44 in the event of a crash and thereby deformed. The steering shaft 4 has a collar 56 which together move in the direction of arrow F to the left in FIG. 3, with the collar 56 acting on the rolling-contact bearing 8 on the side proximal to the steering wheel 2 and moving it conjointly to the left.

The housing 12 for the steering shaft 4 is provided on an inner side with a stop collar 58 which is moved by the rolling-contact bearing 8 in concert with the movement of the steering shaft 4 to the left. The collar 56 on the steering shaft 4 is situated on the steering-wheel proximate side of the rolling-contact bearing 8, and the stop collar 58 of the housing 12 is situated on the steering-wheel distal side of the rolling-contact bearing 8. Both collars 56, 58 ensure that the housing 12 is conjointly moved as the steering shaft 4 is moved to the left. Thus, when the steering column is displaced, the housing 12 is moved conjointly, whereas the housing 24, 44 is prevented from a movement with the housing 12 because the housing 24, 44 is mounted in the area of the steering column to vehicle-body-fixed components, indicated in FIG. 3 by reference numerals 60, 62. As a result, the housing 12 and the housing 24, 44 are moved relative to one another so that the housing 12 is deformed or slashed. The housing 12 is provided in the movement path of the locking bars 26, 46 with perforations 64, 66 by which energy, absorbed as the steering column is displaced, can be adjusted in dependence on a diameter of the perforations 64, 66 and the material thickness of the housing 12 in the area of the perforations 64, 66.

Common to both exemplary embodiments of the present invention according to FIGS. 1 and 3 is that one of the locking devices 14, 16 is provided for locking the steering shaft 4 at the conclusion of a rotation in a first direction of the steering wheel 2, and the other one of the locking devices 14, 16 is provided for locking the steering shaft 4 at the conclusion of a rotation in a second opposite direction of the steering wheel 2, and that the locking devices 14, 16 can be selectively actuated individually or jointly to absorb energy, as the steering shaft is displaced.

In both exemplary embodiments, the actuation of the locking devices 14, 16 can be coupled to the presence of a crash situation. In particular, the actuation of the locking devices 14, 16 can be coupled to the deployment of an airbag. Such airbag deployment mechanisms can easily be integrated in a control device which is typically provided to control the feedback device 6 and the locking devices 14, 16.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. An electric steering system, comprising:
a steering wheel;
a first housing;
a steering shaft arranged in the first housing and rotatably mounted to a motor vehicle; and
a first locking device configured to lock the steering shaft at conclusion of a rotation as limitation of a steering angle input, said first locking device including a second housing connected in fixed rotative engagement with the first housing, and a locking bar configured for engagement in the steering shaft and arranged in the second housing such as to impact the first housing, when the second housing moves in relation to the first housing in the event of a crash, and to deform the first housing.

2. The steering system of claim 1, wherein the locking bar is arranged such that part of the first housing, when collapsing as a result of the crash, is slashed by the locking bar in a defined manner.

3. The steering system of claim 1, wherein the first housing has perforations along a movement path of the locking bar.

4. The steering system of claim 1, further comprising rolling-contact bearings configured to support the steering shaft on the first housing, said steering shaft having a collar disposed on a steering-wheel proximate side of one of the rolling-contact bearings, said first housing having a stop collar disposed on a steering-wheel distal side of the one of the rolling-contact bearings.

5. The steering system of claim 1, wherein the first locking device has a guide bore which extends perpendicular to the steering shaft, said locking bar being arranged in the guide bore for movement in an axial direction.

6. The steering system of claim 1, wherein the first locking device is configured to lock the steering shaft at the conclusion of a rotation in a first rotation direction of the steering wheel, and further comprising a second locking device configured to lock the steering shaft at the conclusion of a rotation in a second opposite rotation direction of the steering wheel, said first and second locking devices being selectively actuatable.

7. The steering system of claim 6, wherein actuation of the first and second locking devices is dependent on an occurrence of a crash situation.

8. The steering system of claim 7, wherein actuation of the first and second locking devices is dependent on a deployment of an airbag.

9. The steering system of claim 1, further comprising a solenoid configured to actuate the locking bar.

10. The steering system of claim 1, further comprising a control unit operably connected to the locking bar.

11. An electric steering system, comprising:
a steering wheel;
a first housing;
a steering shaft arranged in the first housing and rotatably mounted to a motor vehicle; and
a first locking device configured to lock the steering shaft at conclusion of a rotation as limitation of a steering angle input, said first locking device including a second housing connected in fixed rotative engagement with the first housing, and a locking bar configured for engagement in the steering shaft and arranged in the second housing such that the locking bar impacts the steering shaft, when the steering shaft moves in relation to the second housing in the event of a crash, and thereby undergoes a deformation.

12. The steering system of claim 11, wherein the steering shaft has a stop for interaction with the locking bar such that the stop deforms the locking bar, as the steering shaft collapses in the event of a crash.

13. The steering system of claim 12, further comprising a second locking device having a locking bar arranged at a distance to the locking bar of the first locking device such that the locking bar of the first locking device and the locking bar of the second locking device are deformed by the stop successively, as the steering shaft collapses in the event of a crash.

14. The steering system of claim 12, wherein the locking bar of the first locking device and the locking bar of the second locking device are arranged in opposing staggered relationship.

15. The steering system of claim 11, wherein the first locking device has a guide bore which extends perpendicular to the steering shaft, said locking bar being arranged in the guide bore for movement in an axial direction.

16. The steering system of claim 11, wherein the first locking device is configured to lock the steering shaft at the conclusion of a rotation in a first rotation direction of the steering wheel, and further comprising a second locking device configured to lock the steering shaft at the conclusion of a rotation in a second opposite rotation direction of the steering wheel, said first and second locking devices being selectively actuatable.

17. The steering system of claim 16, wherein actuation of the first and second locking devices is dependent on an occurrence of a crash situation.

18. The steering system of claim 16, wherein actuation of the first and second locking devices is dependent on a deployment of an airbag.

19. The steering system of claim 11, further comprising a solenoid configured to actuate the locking bar.

20. The steering system of claim 11, further comprising a control unit operably connected to the locking bar.

\* \* \* \* \*